Figure 1:
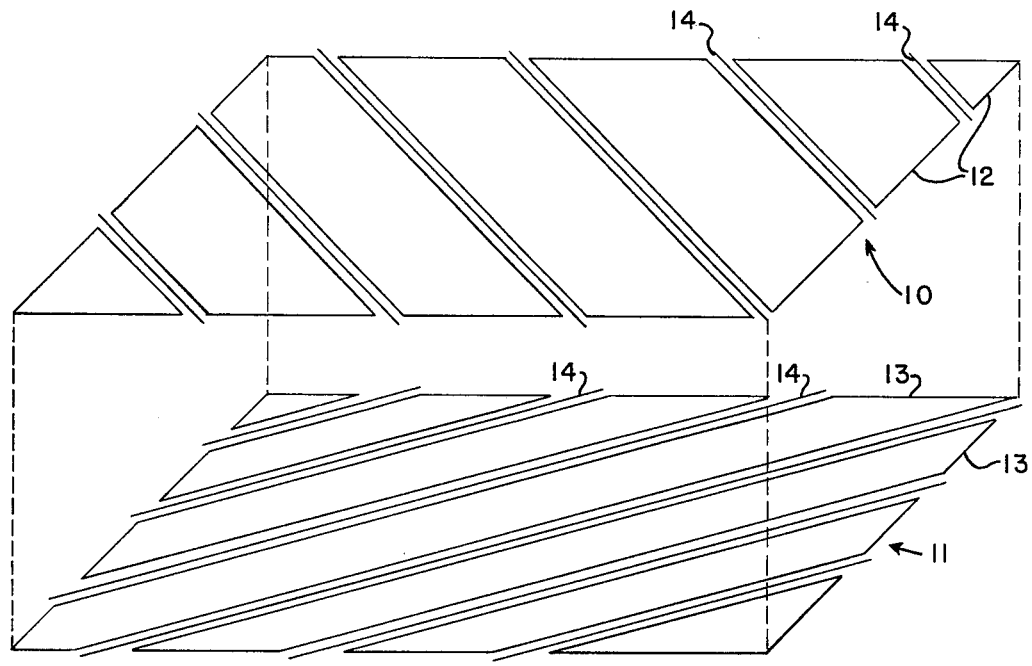

United States Patent [19]

Crane

[11] 4,255,478
[45] Mar. 10, 1981

[54] COMPOSITE STRUCTURES

[75] Inventor: Robert L. Crane, Dayton, Ohio

[73] Assignee: The United States of American as represented by the Secretary of the Air Force, Washington, D.C.

[21] Appl. No.: 20,301

[22] Filed: Mar. 14, 1979

Related U.S. Application Data

[63] Continuation of Ser. No. 909,151, May 24, 1978, abandoned.

[51] Int. Cl.³ .............................................. B32B 5/12
[52] U.S. Cl. ................................... 428/113; 428/109; 428/110; 428/112; 428/114; 428/902; 416/230
[58] Field of Search ............... 428/113, 114, 366, 367, 428/109, 110, 112, 902; 416/230, 230 A; 244/123

[56] References Cited

U.S. PATENT DOCUMENTS

| | | | |
|---|---|---|---|
| 3,672,936 | 6/1972 | Ehrenreich | 428/366 |
| 3,676,200 | 7/1972 | Rembold et al. | 428/366 |
| 3,700,535 | 10/1972 | McCoy et al. | 428/367 |
| 3,768,760 | 10/1973 | Jensen | 428/367 |
| 3,853,610 | 12/1974 | Byrne | 428/367 |
| 3,956,564 | 5/1976 | Hillig | 428/367 |

Primary Examiner—George F. Lesmes
Assistant Examiner—E. Rollins Buffalow
Attorney, Agent, or Firm—Donald J. Singer; William J. O'Brien

[57] ABSTRACT

A composite structure is fabricated from fiber-reinforced tape, segments of the tape being stacked one upon another so as to form a plurality of plies. A boron fiber is positioned adjacent to or along an edge of each of the tape segments. Because of the X-ray opacity of the boron fiber's tungsten boride core and because the boron fiber will break when a ply is damaged, damage to the composite structure can be detected by radiographic examination.

5 Claims, 2 Drawing Figures

COMPOSITE STRUCTURES

RIGHTS OF THE GOVERNMENT

The invention described herein may be manufactured and used by or for the Government of the United States all for governmental purposes without the payment of any royalty.

This is a continuation of application Ser. No. 909,151, filed May 24, 1978.

FIELD OF THE INVENTION

This invention relates to composite structures which have the capability of being examined radiographically to determine the presence and extent of mechanical damage. In one aspect, it relates to a method for the nondestructive examination of composite structures.

BACKGROUND OF THE INVENTION

The mechanical properties of fiber-reinforced materials are dominated by the properties and distribution of the fiber constituent. Fiber distribution flaws of importance to composite integrity include such gross imperfections as missing or misaligned tape segments. The results of such errors can range from an improper thickness to warping of the component. Less important distribution flaws include such defects as improper tape-to-tape spacing, wrinkling of a tape, waviness, and the like.

To assure the structural reliability of composite parts, there is a need for an effective method of nondestructive examination. At the present time, even with automatic tape-laying machines, the inspection for the above-mentioned defects is performed visually prior to lay-up of the plies. Visual examination is a difficult and expensive process since the inspector must examine black composite tapes on a background of black graphite fibers. Several techniques have been suggested to detect fiber distribution flaws even after consolidation of the component. Included among such techniques is the addition to the preform of lead glass fibers which can be seen radiographically. Another suggested technique involves the use of eddy current measurements for graphite composites. Both of these methods have several disadvantages. Lead glass fibers provide no indication as to whether a composite is damaged in service, i.e., has ruptured plies; they only tell if plies are properly oriented. Also, lead glass fibers require special handling because of their low strength, are difficult to obtain, and are very expensive. The eddy current technique can be used only on graphite-reinforced composites and decreases in sensitivity with increasing part thickness.

It is an object of this invention, therefore, to provide a composite structure which can be nondestructively examined to determine the presence and extent of mechanical damage.

Another object of the invention is to provide a method for the nondestructive examination of composite structures.

Figure 2:
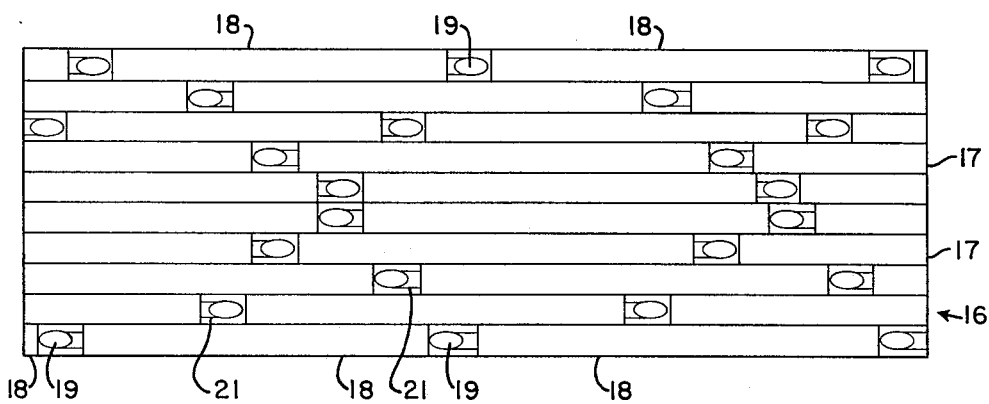

Other objects and advantages of the invention will become apparent to those skilled in the art upon consideration of the accompanying disclosure and the drawing, in which:

FIG. 1 is a schematic representation in perspective of a composite structure of this invention; and FIG. 2 is a front elevational view of a composite structure of this invention.

SUMMARY OF THE INVENTION

The present invention resides in a composite structure comprising segments or pieces of a fiber-reinforced tape stacked one upon another so as to form a plurality of plies; and a boron fiber positioned along an edge of each tape segment.

In one embodiment, the invention lies in a method for the nondestructive examination of a composite structure. According to the method, a composite structure fabricated from fiber-reinforced tape segments stacked upon one another so as to form a plurality of plies, each tape segment having a boron fiber positioned along one of its edges is X-ray radiographed, thereby obtaining a radiograph that shows images of the boron fibers. The radiograph is then examined to determine from the condition or state of the boron fibers if the composite structure contains any fiber distribution flaws, e.g., misaligned plies.

Various fiber-reinforced tapes suitable for fabricating composites or laminates can be used in the practice of the present invention. Examples of materials that can be utilized as reinforcement include glass, aluminum oxide, carbon and graphite fibers as well as organic fibers generally. However, it should be understood that the invention is not applicable to tapes that are reinforced with boron fibers. Such suitable tapes are available from commercial sources and are supplied as a prepreg tape, often with recommended curing conditions. The tapes are frequently formed with a thermosetting resin as the matrix and graphite fibers as the reinforcing material. Any suitable thermosetting resin, of which there are many discribed in the literature, can be employed. Examples of such suitable resins or polymers include poly-epoxides, such as the condensation products of bisphenol A (4,4'-isopropylidenephenol) and epichlorohydrin; phenolic resins prepared by the reaction of phenol and formaldehyde; polymide resins formed by the condensation of an aromatic tetrabasic acid anhydride and an aromatic diamine; polybenzimidazole resins formed by the reaction of an aromatic tetraamine with an aromatic diacid; pyrrone resins formed by the condensation of an aromatic dianhydride and an aromatic tetraamine, and the like. It is usually preferred to utilize a tape having an epoxy resin as the matrix and graphite fibers as the reinforcing agent.

Reference is now made to FIG. 1 of the drawing which illustrates schematically a composite structure of this invention. As shown, the composite structure is formed from two plies 10 and 11. For convenience in viewing, the plies are depicted as being separated from one another. However, it will be understood that in an actual lay-up ply 10 is positioned directly upon ply 11. Furthermore, the number of plies in a composite structure will generally exceed two, the number used being dictated by the desired thickness of the structure.

Ply 10 is formed from tape segments 12 while ply 11 is composed of tape segments 13. The tape segments are usually cut to the approximate size desired for the composite which upon completion of the lay-up and after curing can be trimmed or cut to obtain a finished product. The tape is a graphite fiber-reinforced material in which the fibers are embedded in a resin matrix so as to be parallel to the edges of the tape. The resin, preferably an epoxy resin, generally constitutes about 25 to 50 weight percent of the tape. In forming each individual ply, the tape segments are positioned so that the graphite fibers are parallel to each other. And while all of the plies can be positioned unidirectionally, i.e., with all of the fibers parallel to one another, for added strength the plies are disposed multi-directionally, i.e., with the fibers of one ply at an angle with the fibers of another ply. For example, the plies may be stacked in 0°, 45°, 90° or 0°, 45°, −45°, 90° symmetrical patterns to provide quasi-isotropic composite structures. As illustrated in FIG. 1, the plies are stacked in a 45°, −45° pattern.

For the sake of clarity, the tape segments in FIG. 1 are shown as being separated from one another. However, it is to be understood that in an actual lay-up edges of the tape segments abut or are in contact with one another. A boron fiber 14 is positioned along and between the abutting edges of the tape segments. However, it is within the scope of the invention to dispose additional boron fibers between and parallel to those positioned along the tape edges. It is important that the boron fibers have a diameter equal to or less than the thickness of the plies so as to avoid breakage or crushing of the fibers during consolidation of the composite. As will be discussed hereinafter, it is preferred that the boron fibers have a failure strain about equal to that of the graphite reinforcing fibers. Boron fibers are available commercially in a wide variety of diameters and strength levels.

Referring to FIG. 2, there is illustrated a front elevational view of a composite 16 prior to consolidation. The composite is composed of a plurality of plies 17 stacked one upon the other. Each of the plies is formed from tape segments 18 which are arranged in a 45°, −45° pattern. Positioned along an edge of each tape segment is a boron fiber 19. The thickness of the plies and the diameter of the boron fibers have been exaggerated somewhat so as to facilitate an understanding of the structure. Since the boron fibers are laid along edges of the tape segments, they are likewise arranged in a 45°, −45° pattern. As a result, a small portion 21 of the ends of the boron fibers is visible. It is to be noted that the arrangement of boron fibers is such that no single boron fiber is positioned vertically over another boron fiber.

Upon completion of the lay-up, the composite is consolidated by curing in a press or mold. The curing conditions can vary over rather broad ranges, e.g., by heating to a temperature in the range of about 175° to 450° F. under a pressure of about 100 to 1000 psi for a period of about 1 to 8 hours. After cooling, generally while under pressure, the composite is then often postcured by heating it in the absence of oxygen to an elevated temperature over an extended period of time, e.g., to a temperature ranging from 300° to 750° F. over a period of about 12 to 72 hours. Thus, the postcuring can be conducted in a furnace in the presence of an inert gas, such as nitrogen, argon or helium. In many instances the supplier of the prepreg tape recommends curing conditions that should be used.

As mentioned above, it is preferred that the failure strain of the boron fibers be about equal to the failure strain of the graphite reinforcing fibers. The reason for this requirement is so that damage to the composite causing breakage of graphite fibers will also result in fracture of boron fibers. Because of the known relationship existing between certain properties of fibers, boron fibers can be readily obtained from commercial sources that have a failure strain about equal to that of the graphite fibers. This relationship can be expressed by the following formulas:

(1) $\tau = E\chi$ or (2) $\chi = \tau/E$, where $\tau$ equals stress (ultimate tensile strength), E equals modulus of elasticity, and 102 equals failure strain. The stress and modulus of the graphite fibers in a prepreg tape are generally known quantities indicated by the tape supplier or the values can be readily determined by standard methods. By way of illustration, assume that the graphite reinforcing fibers have an ultimate tensile strength of 100 ksi and a modulus of $25 \times 10^6$ psi. Then, according to equation (2) above, failure strain equals $100 \times 10^3$ psi/$25 \times 10^6$ psi or $4 \times 10^{-3}$ in/in. Thus, a boron fiber is required that also fails at $4 \times 10^{-3}$ in/in. However, since the modulus of the boron fiber is equal to $50 \times 10^6$ psi, a boron fiber is required that has an ultimate tensile strength equal to $50 \times 10^6 \times 4 \times 10^{-3}$ or 200 ksi as determined by equation (1) above.

Boron fibers have a tungsten boride core which is opaque to X-rays. As a result, when a composite of this invention is X-ray radiographed, images of the boron fibers show on the radiograph. Thus, inspection of the radiograph makes it possible to detect defects in the composite plies, such as overlap, underlap, waviness, or wrinkling. Furthermore, by using a boron fiber having a failure strain about equal to that of the graphite fibers, it is possible to determine the presence and extent of damage within the composite structure. This is the case since impact damage that fractures boron fibers also breaks the graphite reinforcing fibers. And since the boron fibers are arranged so that they are staggered with respect to each other, i.e., they are not vertically aligned one above the other, the depth of damage to a composite can be readily determined. As applied to composite parts used in aircraft, this capability of the present invention to assess impact damage is particularly important since no known nondestructive test method is able to provide such a quantified description of mechanical damage.

A more complete understanding of the invention can be obtained by referring to the following illustrative examples which are not intended, however, to be unduly limitative of the invention.

EXAMPLE I

A 50-ply composite panel was fabricated, using Rigidite prepreg tape, a product of Whittaker Corp., Costa Mesa, Calif. The tape was composed of Thornel 300 graphite fibers, a product of Union Carbide Corp., and Narmco 5308 epoxy resin, a product of Whittaker Corp. The plies were formed by laying up the tape in a (0°, +45°, −45°) $_{2s}$ pattern in the manner described hereinabove. Boron fibers 0.1 mm in diameter were positioned parallel to the tape edges and spaced about 1 inch apart. The panel was consolidated by using a standard time-temperature-pressure cycle. The finished panel was X-ray radiographed using type M Kodak film and the following exposure parameters: 25 KV, 3 mA, 120 seconds. The boron filaments were clearly visible on the radiograph obtained.

EXAMPLE II

Specimens, whose dimensions were about $0.794 \times 1.27 \times 13.3$ cm, were cut from the panel fabricated as described in Example I. The specimens were impacted with BB shot in a gas gun facility. The specimens were X-ray radiographed and an examination of the radiographs obtained indicated that damage to the specimens extended to about a depth of 4 plies. From the foregoing it is seen that the method of this invention makes possible the nondestructive inspection of bruised or damaged composite structures to determine both the extent and area of damage. This is accomplished merely by noting from the radiograph which fibers are broken and in which layers. Also, examination of the radiograph can uncover defects such as fiber misalignment, waviness, tape over or underlap, wrinkles, missing plies, and stray fibers.

As will be evident to those skilled in the art, modifications of the present invention can be made in view of the foregoing disclosure without departing from the spirit and scope of the invention.

I claim:

1. A composite structure comprising a resin tape reinforced with fibers other than boron fibers having a tungsten boride core, the reinforcing fibers being parallel to edges of the tape, and segments of the tape being stacked one upon another so as to form a plurality of plies; and a boron fiber having a tungsten boride core positioned along an edge of each tape segment and having a length about equal to the length of the edge, the tape reinforcing fibers and the boron fibers having about the same failure strain.

2. The composite structure according to claim 1 in which a single boron fiber having a tungsten boride core in positioned along an edge of each tape segment.

3. The composite structure according to claim 1 in which the fiber-reinforced resin tape is formed with a thermosetting resin as the matrix and graphite fibers as the reinforcing material.

4. The composite structure according to claim 3, in which the thermosetting resin is an epoxy resin.

5. The composite structure according to claim 4 in which the tape segments are stacked so that their edges and the boron fibers positioned there along are vertically non-aligned.

* * * * *